United States Patent Office 3,819,687
Patented June 25, 1974

3,819,687
3-OXYGENATED 5,19-CYCLO-A-NOR-5α,10α,17α-PREGN-20-YN-17-OLS AND ESTERS
George R. Lenz, Glenview, Ill., assignor to
G. D. Searle & Co., Chicago, Ill.
No Drawing. Filed Aug. 24, 1973, Ser. No. 391,316
Int. Cl. C07c 171/06
U.S. Cl. 260—488 B        10 Claims

ABSTRACT OF THE DISCLOSURE

Preparation of estrogenic and fertility-inhibiting 3-oxygenated 5,19 - cyclo-A-nor-5α,10α,17α-pregn-20-yn-17-ols and esters is disclosed.

---

This invention relates to 3-oxygenated 5,19-cyclo-A-nor - 5α,10α,17α-pregn-20-yn-17-ols and esters, and to processes for the preparation thereof. More particularly, this invention relates to steroids of the formula

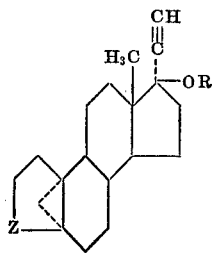

wherein R represents hydrogen or lower alkanoyl and Z represents carbonyl, α - hydroxymethylene or ξ-(lower alkanoyloxy)methylene.

"Lower alkanoyloxy" as used herein denotes the grouping

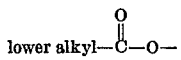

wherein the lower alkyl constituent is methyl, ethyl, propyl, isopropyl, butyl, isobutyl, sec.-butyl, tert.-butyl, pentyl, neopentyl, hexyl, isohexyl, heptyl, or like monovalent, saturated, acyclic, straight- or branched-chain, hydrocarbon radical of the formula

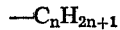

in which $n$ represents a positive integer less than 8.

The steroids to which this invention relates are useful by reason of their valuable biological properties. Among these properties are estrogenic and fertility-inhibiting activity, standardized tests for which are described in U.S. 3,501,506 and U.S. 3,462,466, respectively. 17-Hydroxy-5,19 - cyclo-A-nor-5α,10α,17α-pregn-20-yn-3-one, the representative product of Example 1 hereinafter, was found estrogenic at 30 mcgm. and fertility-inhibiting at 4 mg. when subcutaneously administered in the specified tests.

Those skilled in the art will recognize that observations of activity in standardized tests for particular biological effects are fundamental to the development of valuable new drugs, both veterinary and human.

Preparation of the subject steroids proceeds by irradiating a tert.-butyl alcohol solution of 17α-ethynyl-17β-hydroxyestr-5(10)-en-3-one (norethynodrel) in a nitrogen atmosphere, using a 450-watt mercury arc as the light source and a filter (for example, Pyrex glass) to screen out wave lengths below 300 nanometers. The resultant 17 - hydroxy-5,19-cyclo-A-nor-5α,10α,17α-pregn-20-yn-3-one, upon prolonged contact in pyridine solution with a lower alkanoic acid anhydride [a compound having the formula

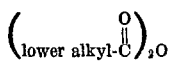

wherein "lower alkyl" is defined as above], affords 17-(lower alkanoyloxy)-5,19-cyclo-A-nor-5α,10α,17α-pregn-20-yn-3-one. Contacting 17-hydroxy-5,19-cyclo-A-nor-5α, 10α,17α-pregn-20-yn-3-one with lithium hydrotri-tert.-butoxyaluminate in tetrahydrofuran affords 5,19-cyclo-A-nor-5α,10α,17α-pregn-20-yne-3α,17-diol, from which a 3ξ-(lower alkanoyloxy) - 5,19-cyclo-A-nor-5α,10α,17α-pregn-20-yn-17-ol eventuates on relatively brief contact with a lower alkanoic acid anhydride in pyridine. The product is a mixture of 3-epimers. Prolongation of contact effects diesterification, the product being 3ξ,17-di(lower alkanoyloxy)-5,19-cyclo-A-nor-5α,10α,17α-pregn-20-yne, again a mixture of 3-epimers. From a 17-(lower alkanoyloxy)-5,19-cyclo-A-nor-5α,10α,17α,-pregn-20-yn-3-one, on contacting with lithium hydrotri-tert.-butoxyaluminate in tetrahydrofuran, a 17-(lower alkanoyloxy)-5,19-cyclo-A-nor-5α,10α,17α-pregn-20-yn-3α-ol is obtained.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

17-Hydroxy-5,19-cyclo-A-nor-5α,10α,17α-pregn-20-yn-3-one

A solution of 5 parts of 17α-ethynyl-17β-hydroxyestr-5(10)-en-3-one in 240 parts of tert.-butyl alcohol is irradiated for 16 hours with a 450-watt mercury arc through a Pyrex filter under nitrogen. This irradiation is twice repeated, whereupon the reaction mixture is stripped of solvent by vacuum distillation and the residue taken up in benzene. The benzene solution is chromatographed on silica gel, using benzene and mixtures thereof with increasing amounts of ethyl acetate as developing solvent. From an eluate consisting of 1 part of ethyl acetate and 19 parts of benzene, on removal of solvent by vacuum distillation, 17-hydroxy-5,19-cyclo-A-nor-5α,10α, 17α-pregn-20-yn-3-one melting at approximately 239–240° is obtained as the residue. The product has the formula

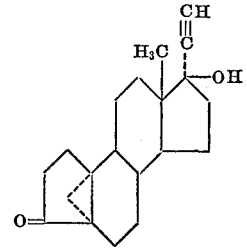

EXAMPLE 2

17-Acetoxy-5,19-cyclo-A-nor-5α,10α,17α-pregn-20-yn-3-one

A solution of 3 parts of 17-hydroxy-5,19-cyclo-A-nor-5α,10α,17α-pregn-20-yn-3-one in a mixture of 20 parts of acetic anhydride with 30 parts of pyridine is stirred at room temperatures for 7 days, whereupon 200 parts of methyl alcohol is added and the resultant mixture poured into 1000 parts of water. The mixture thus obtained is extracted with dichloromethane. The dichloromethane extract is dried over anhydrous sodium sulfate and stripped of solvent by vacuum distillation. The residue, upon crystallization from a mixture of ethyl acetate and petroleum ether, affords 17-acetoxy-5,19-cyclo-A-nor-5α,10α, 17α-pregn-20-yn-3-one melting at 168–172°.

EXAMPLE 3

17-Propionyloxy-5,19-cyclo-A-nor-5α,10α,17α-pregn-20-yn-3-one

A mixture of 3 parts of 17-hydroxy-5,19-cyclo-A-nor-5α,10α,17α-pregn-20-yn-3-one, 20 parts of propionic anhydride, and 30 parts of pyridine is stirred at room temperatures for 10 days. The reaction mixture is then mixed with 200 parts of methyl alcohol, and the resultant mixture is poured into 1000 parts of water. The mixture thus obtained is extracted with dichloromethane. The dichloromethane extract is dried over anhydrous sodium sulfate and stripped of solvent by vacuum distillation, providing 17 - propionyl - 5,19-cyclo-A-nor-5α,10α,17α-pregn-20-yn-3-one as the residue.

EXAMPLE 4

5,19-Cyclo-A-nor-5α,10α,17α-pregn-20-yne-3α,17-diol

To a solution of 2 parts of 17-hydroxy-5,19-cyclo-A-nor-5α,10α,17α-pregn-20-yn-3-one in 75 parts of tetrahydrofuran is added 4 parts of lithium hydrotri-tert.-butoxyaluminate. The resultant mixture is stirred overnight at room temperature and then poured into 500 parts of water. The mixture thus obtained is extracted with chloroform. The chloroform extract is dried over anhydrous sodium sulfate and stripped of solvent by vacuum distillation. The colorless residue, recrystallized from a mixture of dichloromethane and ethyl acetate, affords 5,19-cyclo-A-nor-5α,10α,17α-pregn-20-yne-3α,17-diol melting at 209–213°.

EXAMPLE 5

17-Acetoxy-5,19-cyclo-A-nor-5α,10α,17α-pregn-20-yn-3α-ol

To a solution of 1 part of 17-acetoxy-5,19-cyclo-A-nor-5α,10α,17α-pregn-20-yn-3-one in 25 parts of tetrahydrofuran is added 2 parts of lithium hydrotri-tert.-butoxyaluminate. The resultant mixture is stirred at room temperatures for 1 hour, then poured into 500 parts of 5% hydrochloric acid. The mixture thus obtained is extracted with dichloromethane. The dichloromethane extract is dried over anhydrous sodium sulfate and stripped of solvent by vacuum distillation. The residue, recrystallized from aqueous methyl alcohol, is 17-acetoxy-5,19-cyclo-A-nor-5α,10α,17α-pregn-20-yn-3α-ol melting at 154–159°.

EXAMPLE 6

17-Propionyloxy-5,19-cyclo-A-nor-5α,10α,17α-pregn-20-yne

Substitution of 1 part of 17-propionyloxy-5,19-cyclo-A-nor-5α,10α,17α-pregn-20-yn-3-one for the 17-acetoxy-5,19-cyclo-A-nor-5α,10α,17α-pregn-20-yn-3-one called for in Example 5 affords, by the procedure there detailed, 17 - propionyloxy-5,19-cyclo-A-nor-5α,10α,17α-pregn-20-yne.

EXAMPLE 7

3ξ-Acetoxy-5,19-cyclo-A-nor-5α,10α,17α-pregn-20-yn-17-ol

A solution of 750 parts of 5,19-cyclo-A-nor-5α,10α,17α-pregn-20-yne-3α,17-diol in 4000 parts of acetic anhydride and 5000 parts of pyridine is allowed to stand at room temperatures overnight, whereupon 5000 parts of methyl alcohol, 100,000 parts of water, and 100,000 parts of dichloromethane are consecutively mixed in. The resultant mixture is washed with 100,000 parts of 5% hydrochloric acid, and then with 100,000 parts of aqueous 5% potassium carbonate. The solution which results is dried over anhydrous sodium sulfate and stripped of solvent by vacuum distillation. The residue, recrystallized from aqueous methyl alcohol, affords 3ξ-acetoxy-5,19-cyclo-A-nor-5α,10α,17α-pregn-20-yn-17-ol as a 43/57 mixture of 3-epimers melting in the range, 123–150°.

EXAMPLE 8

3ξ-Propionyloxy-5,19-cyclo-A-nor-5α,10α,17α-pregn-20-yn-17-ol

Substitution of 4000 parts of propionic anhydride for the acetic anhydride called for in Example 7 affords, by the procedure there detailed, 3ξ-propionyloxy-5,19-cyclo-A-nor-5α,10α,17α-pregn-20-yn-17-ol.

EXAMPLE 9

3ξ,17-Diacetoxy-5,19-cyclo-A-nor-5α,10α,17α-pregn-20-yne

Substitution of 3-parts of 5,19-cyclo-A-nor-5α,10α,17α-pregn-20-yne-3α,17-diol for the 17-hydroxy-5,19-cyclo-A-nor-5α,10α,17α-pregn-20-yn-3-one called for in Example 2 affords, by the procedure there detailed, 3ξ,17-diacetoxy-5,19-cyclo-A-nor-5α,10α,17α-pregn-20-yne.

What is claimed is:

1. A compound of the formula

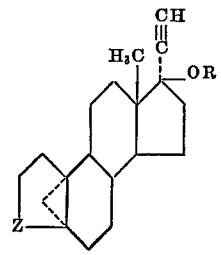

wherein R represents hydrogen or lower alkanoyl and Z represents carbonyl, α-hydroxymethylene, or ξ-(lower alkanoyloxy)methylene.

2. A compound according to Claim 1 which is 17-hydroxy-5,19-cyclo-A-nor-5α,10α,17α-pregn-20-yn-3-one.

3. A compound according to Claim 1 having the formula

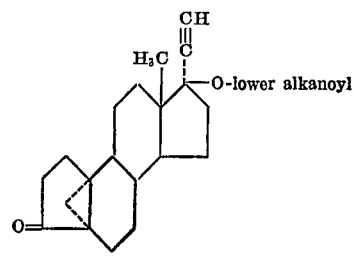

4. A compound according to Claim 1 which is 17-acetoxy-5,19-cyclo-A-nor-5α,10α,17α-pregn-20-yn-3-one.

5. A compound according to Claim 1 which is 5,19-cyclo-A-nor-5α,10α,17α-pregn-20-yne-3α,17-diol.

6. A compound according to Claim 1 having the formula

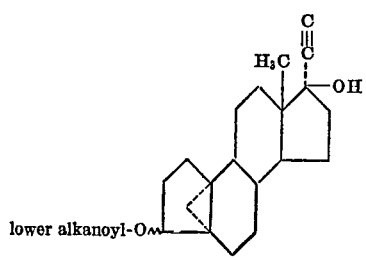

7. A compound according to Claim 1 which is 17-acetoxy-5,19-cyclo-A-nor-5α,10α,17α-pregn-20-yn-3α-ol.

8. A compound according to Claim 1 having the formula
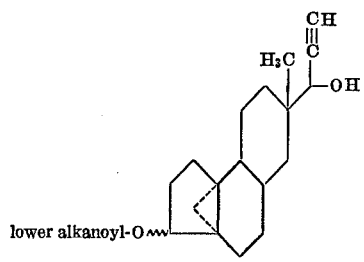
9. A compound according to Claim 1 which is 3ξ-acetoxy-5,19-cyclo-A-nor-5α,10α,17α-pregn-20-yn-17-ol.
10. A compound according to Claim 1 which is 3ξ,17-diacetoxy-5,19-cyclo-A-nor-5α,10α,17α-pregn-20-yne.
References Cited
UNITED STATES PATENTS
| | | | |
|---|---|---|---|
| 3,246,037 | 4/1966 | Knox | 260—586 H |
| 3,257,425 | 6/1966 | Knox | 260—586 H |
VIVIAN GARNER, Primary Examiner
U.S. Cl. X.R.
260—410, 586 H, 617 F

UNITED STATES PATENT OFFICE
CERTIFICATE OF CORRECTION

Patent No. __3,819,687__  Dated __June 25, 1974__

Inventor(s) __George R. Lenz__

It is certified that error appears in the above-identified patent and that said Letters Patent are hereby corrected as shown below:

Column 4, line 11, "-17-pregn-" should be -- -17α-pregn- --.

Column 4, third formula,

" 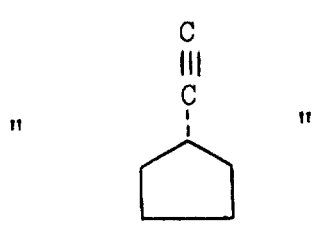 "   should be   -- 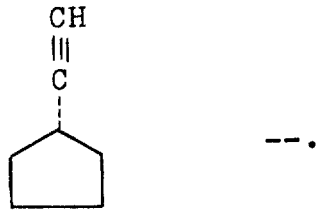 --.

Column 5, formula,

" 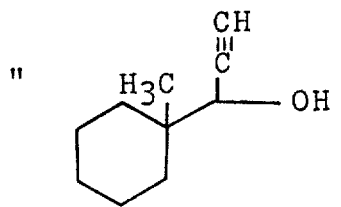 "   should be   -- 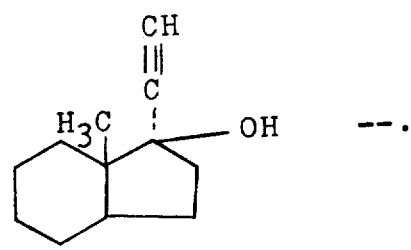 --.

Signed and sealed this 3rd day of December 1974.

(SEAL)
Attest:

McCOY M. GIBSON JR.
Attesting Officer

C. MARSHALL DANN
Commissioner of Patents